(12) United States Patent
Charles et al.

(10) Patent No.: US 6,790,427 B2
(45) Date of Patent: Sep. 14, 2004

(54) PROCESS FOR PRODUCING CHLORINE DIOXIDE

(75) Inventors: Gary Charles, Marietta, GA (US); Michael Burke, Cumming, GA (US)

(73) Assignee: Eka Chemicals, Inc., Marietta, GA (US)

(*) Notice: Subject to any disclaimer, the term of this patent is extended or adjusted under 35 U.S.C. 154(b) by 370 days.

(21) Appl. No.: 09/887,264

(22) Filed: Jun. 25, 2001

(65) Prior Publication Data

US 2003/0007899 A1 Jan. 9, 2003

(51) Int. Cl.$^7$ ............................................... C01B 11/02
(52) U.S. Cl. ................................... 423/478; 422/129
(58) Field of Search .................. 423/477, 478; 422/129

(56) References Cited

U.S. PATENT DOCUMENTS

| | | | |
|---|---|---|---|
| 2,833,624 A | | 5/1958 | Sprauer .................... 23/152 |
| 3,864,456 A | * | 2/1975 | Winfield et al. ........... 423/478 |
| 4,026,817 A | | 5/1977 | Ciuti et al. ................ 252/312 |
| 4,206,193 A | * | 6/1980 | Partridge et al. ........... 423/478 |
| 4,247,531 A | | 1/1981 | Hicks ....................... 423/477 |
| 4,414,193 A | | 11/1983 | Fredette et al. ............ 423/478 |
| 4,421,730 A | * | 12/1983 | Isa et al. .................... 423/478 |
| 4,534,952 A | | 8/1985 | Rapson ..................... 423/478 |
| 4,839,152 A | * | 6/1989 | Vella et al. ................ 423/478 |
| 5,091,166 A | | 2/1992 | Engstrom .................. 423/478 |
| 5,091,167 A | | 2/1992 | Engstrom .................. 423/478 |
| 5,895,638 A | | 4/1999 | Tenney ..................... 423/478 |
| 5,968,454 A | | 10/1999 | Deacon et al. ............. 422/120 |

FOREIGN PATENT DOCUMENTS

| | | |
|---|---|---|
| EP | 0 515 767 A1 | 12/1992 |
| EP | 0612686 A3 | 2/1994 |
| EP | 0612686 A2 | 2/1994 |
| GB | 2294646 | 5/1996 |
| WO | WO 00/76916 A1 | 5/2000 |

* cited by examiner

*Primary Examiner*—Ngoc-Yen Nguyen
(74) *Attorney, Agent, or Firm*—David J. Serbin

(57) ABSTRACT

The invention concerns a process and an apparatus for continuously producing chlorine dioxide, the process comprising the steps of feeding chlorate ions, acid and hydrogen peroxide as aqueous solutions to a reactor;

reducing chlorate ions in the reactor to chlorine dioxide, thereby forming a product stream in the reactor containing chlorine dioxide;

feeding motive water to an conductor comprising a nozzle;

bringing the motive water to flow through the nozzle and causing it to flow further through the eductor in an at least partially spiral or helical manner, transferring the product stream from the reactor to the eductor and mixing it with the motive water and thereby forming a diluted aqueous solution containing chlorine dioxide, and;

withdrawing the diluted aqueous solution containing chlorine dioxide from the eductor.

19 Claims, 3 Drawing Sheets

PROCESS FOR PRODUCING CHLORINE DIOXIDE

FIELD OF THE INVENTION

The present invention relates to a process for producing chlorine dioxide from chlorate ions, acid and hydrogen peroxide

BACKGROUND OF THE INVENTION

Chlorine dioxide is used in various applications such as pulp bleaching, fat bleaching, water purification and removal of organic materials from industrial wastes. Since chlorine dioxide is not storage stable, it must be produced on-site.

Chlorine dioxide is usually produced by reacting alkali metal chlorate or chloric acid with a reducing agent in an aqueous reaction medium. Chlorine dioxide may be withdrawn from the reaction medium as a gas, as in the processes described by U.S. Pat. Nos. 5,091,165, 5,091,167 and EP patent 612686. Normally, the chlorine dioxide gas is then absorbed into water to form an aqueous solution thereof.

For production of chlorine dioxide in small-scale units, such as for water purification applications or small bleaching plants, it is favourable not to separate chlorine dioxide gas from the reaction medium but to recover a chlorine dioxide containing solution directly from the reactor, optionally after dilution with water. Such processes are described in U.S. Pat. Nos. 2,833,024, 4,534,852, 5,895,838 and in WO 00/76916, and have in recent years become commercial. However, there is still a need for further improvements. Particularly, it has been found difficult to obtain solutions with sufficiently high concentration of chlorine dioxide as required for some applications, like recycle paper bleaching, bagasse bleaching, or small-scale pulp bleaching. A high concentration of chlorine dioxide also may be useful to any application where minimising the water flow is important.

SUMMARY OF THE INVENTION

It is an object of the invention to provide a process enabling direct production of chlorine dioxide in an aqueous solution of high concentrations.

It is another object of the invention to provide a process for direct production of chlorine dioxide in an aqueous solution with high production capacity.

It is still another object of the invention to provide an apparatus for performing the process.

BRIEF DESCRIPTION OF THE INVENTION

It has surprisingly been found possible to meet these objects by providing a process for continuously producing chlorine dioxide comprising the steps of.

feeding chlorate ions, acid and hydrogen peroxide as aqueous solutions to a reactor:

reducing chlorate ions in the reactor to chlorine dioxide, thereby forming a product stream in the reactor containing chlorine dioxide;

feeding motive water to an eductor comprising a nozzle;

bringing the motive water to flow through the nozzle and causing it to flow further through the eductor in an at least partially, preferably substantially, spiral or helical manner, transferring the product stream from the reactor to the eductor and mixing it with the motive water and thereby forming a diluted aqueous solution containing chlorine dioxide, and;

withdrawing the diluted aqueous solution containing chlorine dioxide from the eductor.

The chlorate ions can be fed to the reactor as an aqueous solution comprising chloric acid and/or a metal chlorate, preferably alkali metal chlorate. The alkali metal may, for example, be sodium, potassium or mixtures thereof, of which sodium is most preferred. Unless chloric acid is used, another acid must be fed to the reactor, preferably a mineral acid such as sulfuric acid, hydrochloric acid or nitric acid, of which sulfuric acid is most preferred. The molar ratio $H_2O_2$ to $ClO_3^-$ fed to the reactor is suitably from about 0.2:1 to about 2:1, preferably from about 0.5:1 to about 1.5:1, most preferably from about 0.5:1 to about 1:1. Metal chlorate and chloric acid always contain some chloride as an impurity, but it is fully possible also to feed more chloride to the reactor, such as metal chloride or hydrochloric acid. However, in order to minimize the formation of chlorine it is preferred to keep the amount of chloride ions fed to the reactor low, suitably below about 1 mole %, preferably below about 0.1 mole %, more preferably less than about 0.05 mole %, most preferably less than about 0.02 mole % $Cl^-$ of the $ClO_3^-$.

In a particularly preferred embodiment alkali metal chlorate and hydrogen peroxide are fed to the reactor in the form of a premixed aqueous solution, for example a composition as described in WO 00/76916, which hereby is incorporated by reference. Such a composition may be an aqueous solution comprising from about 1 to about 6.5 moles/liter, preferably from about 3 to about 6 moles/liter of alkali metal chlorate, from about 1 to about 7 moles/liter, preferably from about 3 to about 5 moles/liter of hydrogen peroxide and at toast one of a protective colloid, a radical scavenger or a phosphoric acid based complexing agent, wherein the pH of the aqueous solution suitably is from about 0.5 to about 4, preferably from about 1 to about 3.5, most preferably from about 1.5 to about 3. Preferably, at least one phosphonic acid based complexing agent is present, preferably in an amount from about 0.1 to about 5 moles/liter, most preferably from about 0.5 to about 3 moles/liter, if a protective colloid is present, its concentration is preferably from about 0.001 to about 0.6 moles/liter, most preferably from about 0.02 to about 0.05 moles/liter. If a radical scavenger is present, its concentration is preferably from about 0.01 to about 1 moles/liter, most preferably from about 0.02 to about 0.2 moles/liter. Particularly preferred compositions comprise at least one phosphonic acid based complexing agent selected from the group consisting of 1-hydroxyethylidene-1,1-diphosphonic acid, 1-aminoethane1,1-diphosphonic acid, amino (methylenephosphonic acid), ethylene diamine tetra (methylenephosphonic acid), hexamethylene diamine tetra (methylenephosphonic acid), diethylenetriamine penta (methylenephosphonic acid), diethylenetriamine hexa (methylenephosphonic acid), and 1-aminoalkane-1,1-diphosphonic acids such as morphollnomethane diphosphonic acid, N,N-dimethyl aminodimethyl diphosphonic acid, aminomethyl diphosphonic acid, or salts thereof, preferably sodium salts. Useful protective colloids include tin compounds, such as alkali metal stannate, particularly sodium stannate ($Na_2(Sn(OH)_6)$). Useful radical scavengers include pyridine carboxylic acids, such as 2,6-pyridine dicarboxylic acid. Preferably the amount of chloride ions is below about 0.5 moles/liter, most preferably below about 0.1 mmoles/liter, particularly below about 0.03 mmoles/liter.

In the case that sulfuric acid is used as a feed, it preferably has a concentration from about 70 to about 98 wt %, most preferably from about 75 to about 85 wt % and preferably a temperature from about 0 to about 80° C., most preferably from about 20 to about 60° C., as it then may be possible to operate the process substantially adiabatically. Preferably from about 2 to about B kg H$_2$SO$_4$, most preferably from about 3 to about 5 kg H$_2$SO$_4$ is fed per kg ClO$_2$ produced. Alternatively, the equivalent amount of another mineral acid may be used.

The net reaction resulting in chlorine dioxide generation can be described by the formula;

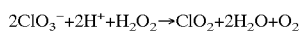

$$2ClO_3^- + 2H^+ + H_2O_2 \rightarrow ClO_2 + 2H_2O + O_2$$

The exact mechanism is complex and is believed to involve a first reaction between chlorate and chloride (even if not added separately always present in sufficient amount as an impurity in chlorate) to give chlorine dioxide and chlorine, followed by reaction of the chlorine with hydrogen peroxide back to chloride. However, considering the net reaction hydrogen peroxide is normally regarded as a reducing agent reacting with the chlorate ions.

The reduction of chlorate ions to chlorine dioxide results in formation of a product stream in the reactor, normally comprising both liquid and foam, and containing chlorine dioxide, oxygen and, in most cases, some remaining unreacted feed chemicals. Chlorine dioxide and oxygen may be present both as dissolved in the liquid and as gas bubbles. When a metal chlorate and a mineral acid are used as feed chemicals, the product stream will then, besides chlorine dioxide and oxygen, contain a metal salt of the mineral acid and normally also some remaining metal chlorate and mineral acid. It has been found possible to achieve a conversion degree of chlorate ions to chlorine dioxide from about 75% to 100%, preferably from about 80 to 100%, most preferably from about 95 to 100%.

The temperature in the reactor is suitably maintained below the boiling point of the reactants and the product stream at the prevailing pressure, preferably from about 20 to about 80° C., most preferably from about 30 to about 80° C. The pressure maintained within the reactor is suitably slightly subatmospheric, preferably from about 30 to about 100 kPa absolute, most preferably from about 65 to about 95 kPa absolute, The reactor may comprise one or several vessels, for example arranged vertically, horizontally or inclined. The reactants may be fed directly to the reactor or via a separate mixing device. Suitably the reactor is a preferably substantially tubular through-flow vessel or pipe, most preferably comprising means for mixing the reacants in a substantially uniform manner. Such means may comprise a disk or the like provided with apertures and arranged inside the reactor, wherein metal chlorate and hydrogen peroxide are fed downstream of the disk, while an acid is fed upstream of the disk and brought to flow through the apertures and then mix with the metal chlorate and the hydrogen peroxide. Such an arrangement has been found to give uniform mixing and stable operation of the process as well as ability to vary the production rate with maintained high chemical efficiency, particularly in reactors arranged substantially vertically with the main flow direction upwards. However, it is also possible to simply feed one of the reactants, e.g. the acid, into the feed line for another reactant or mixture of reactants, e.g. a mixture of metal chlorate and hydrogen peroxide.

The length (in the main flow direction) of the reactor used is preferably from about 50 to about 800 mm, most preferably from about 350 to about 650 mm. It has been found favourable to use a substantially tubular reactor with an inner diameter from about 25 to about 300 mm, preferably from about 70 to about 200 mm. It is particularly favourable to use a substantially tubular reactor having a preferred ratio of the length to the inner diameter from about 12:1 to about 1:1, most preferably from about 8:1 to about 4:1. A suitable average residence time in the reactor is in most cases from about 1 to about 1000 seconds, preferably from about 2 to about 40 seconds, The eductor creates a suction force bringing the product stream, including any liquid, foam and gas therein, to flow into the eductor and mix with the motive water to form a diluted solution containing chlorine dioxide, The motive water is brought to flow in an at least partially spiral or helical manner by any suitable means, such as twisted vanes, internal rifling, or the like, which may be integral or separate from the nozzle and arranged inside or upstream thereof, The nozzle can be of any suitable type and may comprise one or several holes.

The eductor suitably further comprises, in the flow direction from the nozzle, a suction chamber, into which the product stream is transferred from the reactor, and a venturi section, through which the diluted aqueous solution containing chlorine dioxide in such a case is withdrawn. Also eductors with more than one nozzle may be used.

It has been found that the at least partially spiral or helical flow of the motive water increases the production capacity of chlorine dioxide for a given motive water flow, thus enabling production of a product solution with higher chlorine dioxide concentration than what previously was possible only by separating chlorine dioxide gas from the reaction medium and then absorbing it in water, steps not necessary to conduct in the present invention, Thus, it is possible to produce aqueous solutions containing from about 1 to about 4 g/liter of chlorine dioxide, preferably from about 1.5 to about 3.5 g/liter of chlorine dioxide.

The process of the invention is particularly suitable for production of chlorine dioxide in small-scale, for example from about 0.1 to about 100 kg/hr, preferably from about 0.1 to about 50 kg/hr in one reactor, For many applications, a preferred chlorine dioxide production rate is from about 0.1 to about 25 kg/hr, most preferably from about 0.6 to about 10 kg/hr in one reactor. A typical small-scale production unit normally includes only one reactor, although it is possible to arrange several, for example up to about 15 or more reactors in parallel, for example or a bundle of tubes.

The invention further relates to an apparatus for producing chlorine dioxide according to the above described process. The apparatus comprises a reactor provided with feed lines for chlorate ions, hydrogen peroxide and acid, the reactor being connected to an eductor provided with a nozzle for motive water and means for causing the motive water to flow further through the eductor in an at least partially spiral or helical manner.

Preferred embodiments of the apparatus are apparent from the above description of the process and the following description referring to the drawings. The invention is, however, not limited to the embodiments shown in the drawings and encompasses many other variants within the scope of the claims.

DETAILED DESCRIPTION OF THE DRAWINGS

Figure 1:
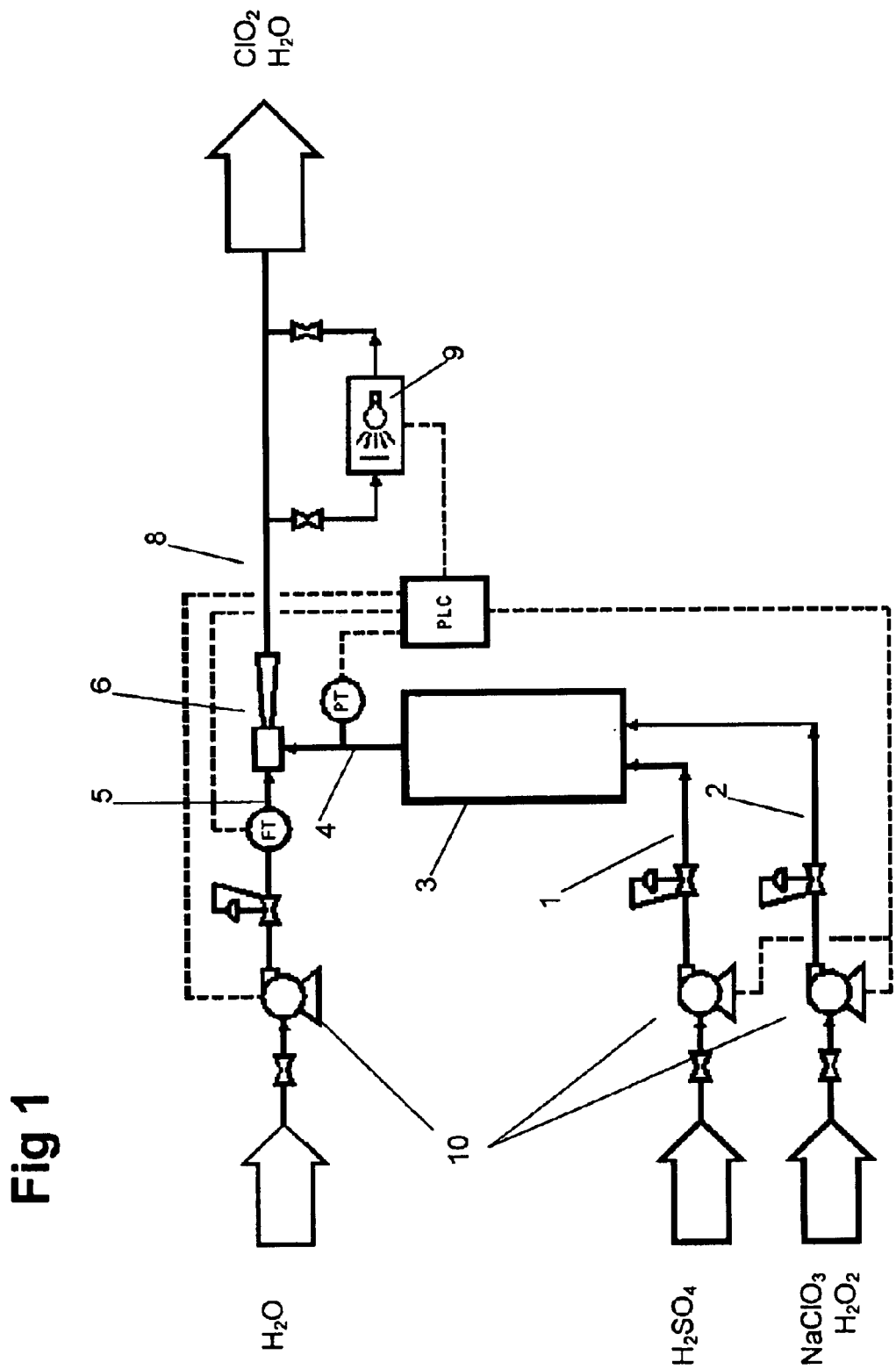
FIG. 1 shows a schematic process diagram for the present invention.

Referring to FIG. 1, a vertical through-flow tubular reactor 3 is supplied with sulfuric acid through feed line 1 and a pre-mixed aqueous solution of sodium chlorate and hydrogen peroxide through line 2. In the reactor 3 the feed streams are mixed and reacted to form a product stream of liquid, foam and gas comprising chlorine dioxide, oxygen, sodium sulfate and some remaining sulfuric acid and sodium chlorate. An eductor 6 is supplied with motive water through feed line 5 and generates a slightly subatmospheric pressure forcing the product stream out from the reactor 3 through line 4 into the eductor 6 where it is mixed with the motive water to form a diluted aqueous product solution. This diluted solution contains chlorine dioxide and the other component from the reactor 3 an is withdrawn as a final product through line B. A process control system including a Programmable Logic Controller (PLC), a chlorine dioxide analyser 9, a pressure transmitter (PT) and a flow transmitter (FT), controls the feed pumps 10 for the chemicals to the reactor 3 and for the motive water to the eductor 8.

Figure 2:
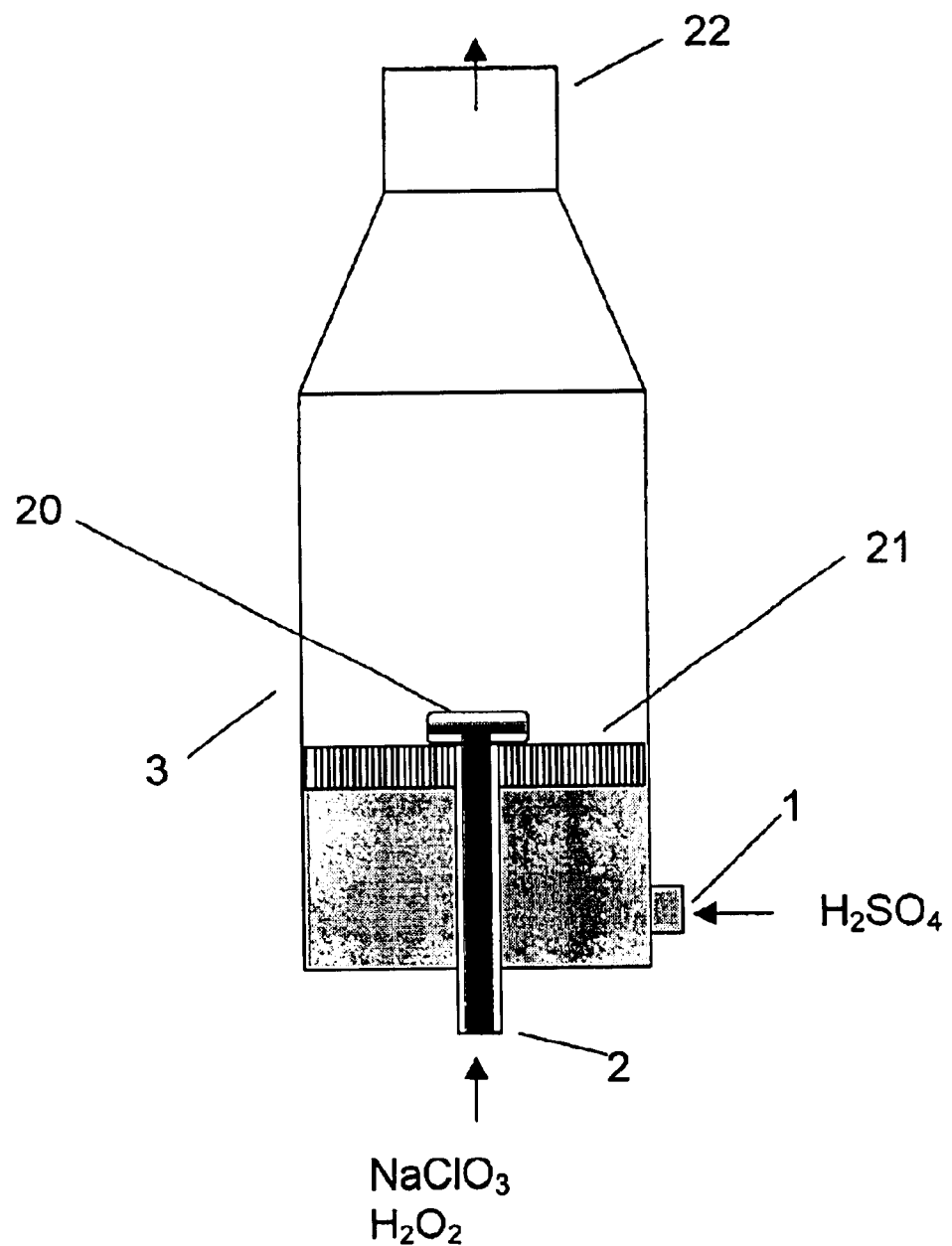
FIG. 2 schematically shows a reactor.

Referring to FIG. 2, a distribution disk 21 provided with apertures is arranged in the lower part of the reactor 3, but above the inlet from the fee line 1 for sulfuric acid. The feed line 2 for the premixed sodium chlorate and hydrogen peroxide solution ends in a distribution nozzle 20 arranged in the centre of the cross section of the reactor just above the distribution disk, The sodium chlorate and hydrogen peroxide solution is then sprayed over the cross section within the reactor 3, while the sulfuric acid flows upwards through the apertures in the distribution disk and in mixed with the sodium chlorate and hydrogen peroxide above the distribution disk 21. Upon mixture, the reaction generating chlorine dioxide starts and creates a product stream of liquid, foam and gas, which stream is withdrawn through the outlet 22 at the top of the reactor 3.

Figure 3:
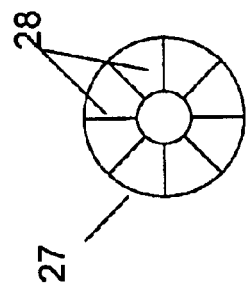
FIGS. 3a and 3b schematically show an eductor and means for causing the motive water to flow in an at least partially spiral or helical manner.
Figure 3:
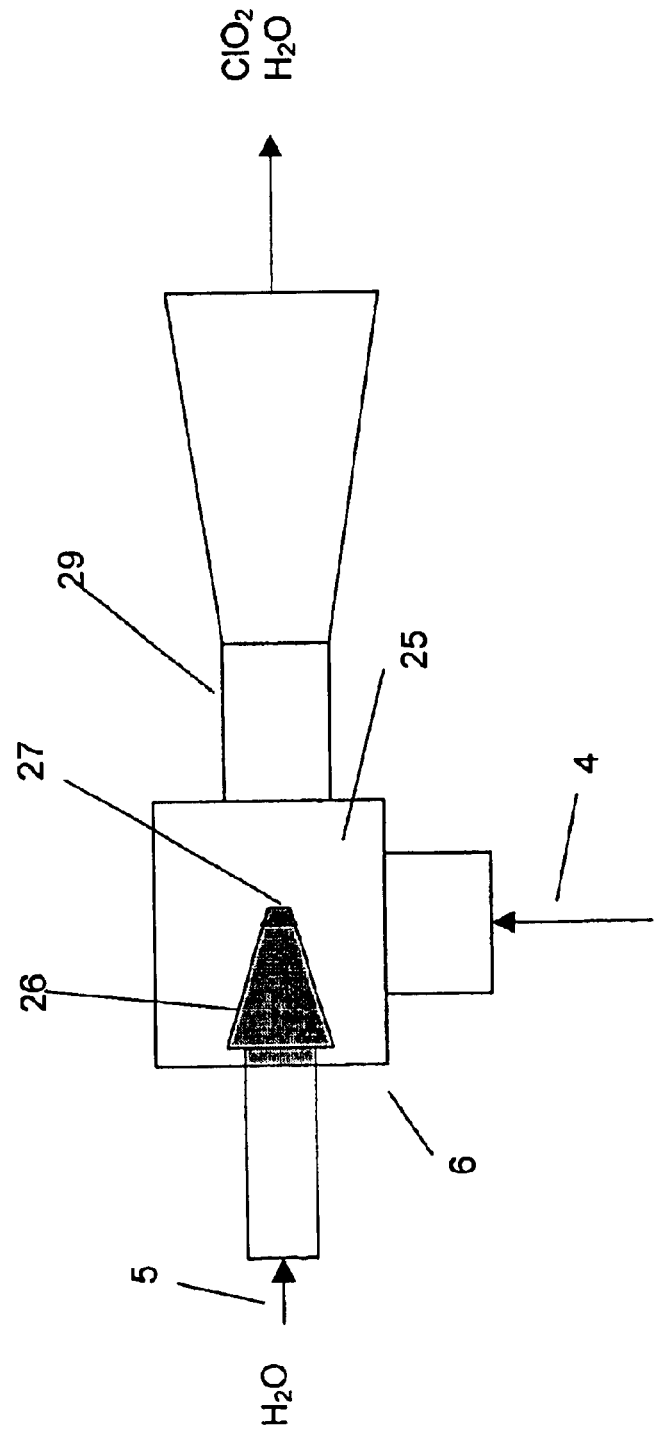

Referring to FIGS. 3a and 3b, the eductor 6 comprises a suction chamber 25, a one hole nozzle 28 with an insert 27 (shown in FIG. 3b in a view through the nozzle) comprising twisted vanes 28, and a venturi section 29. Motive water is supplied from feed line 6 through the nozzle 26 and the insert 27. The twisted vanes 28 of the insert 27 causes the water to flow in an at least partially spiral or helical manner further through the suction chamber 26, where it is mixed with the product stream flowing through line 4 from the reactor 3 (see FIG. 1) to form a diluted chlorine dioxide containing solution discharged from the eductor 6 through the venturi section 29. The flow through the eductor creates a subatmospheric pressure sufficient for forcing the product stream from the reactor to flow into the eductor.

The process equipment, including the reactor 3 and the eductor 6, is suitably made from materials resistant to hydrogen peroxide, sodium chlorate, sulfuric acid and chlorine dioxide Such materials include, for example, glass, tantalum, titanium, fiberglass reinforced plastic, fluoro plastics like PVDF (polyvinylidene fluoride) CPVC (chlorinated polyvinyl chloride), PTFE (polytetrafluoro ethylene), PFA (perfluoro alkoxy polymer), ECTFE (ethylene chlorotrifluoro ethylene) or FEP (fluorinated ethylene propylene), or the use of these materials as a liner material to a structural material like steel or stainless steel. Suitable fluoro plastics are sold under the trademarks Kynar®, Teflon® or Halar®.

The invention is further illustrated through the following example.

EXAMPLE

Chlorine dioxide was produced according to the invention in an apparatus as shown in the Figures. A vertical tubular reactor 3 with an internal diameter of 75 mm and a length of 610 mm was continuously supplied with 78 wt % sulfuric acid and an aqueous solution of 40 wt % sodium chlorate and 10 wt % hydrogen peroxide stabilized with a phosphonic acid based complexing agent. The reactor was maintained at a temperature of about 40–50° C. and an absolute pressure of about 84 kPa (about 17 kPa below atmospheric), the subatmospheric pressure created by supplying an eductor 6 with motive water at an absolute pressure of 790 kPa.

As a comparison, chlorine dioxide was produced in the same manner with the only exception that the eductor used did not comprise any insert to the nozzle causing the motive water to flow in an at least partially spiral or helical manner.

The results are shown in the following table:

| Eductor type | Motive water flow (liter/min) | $ClO_2$ production rate (kg/h) | $ClO_2$ conc. in final product (mg/liter) |
| --- | --- | --- | --- |
| with insert (invention) | 48.1 | 9.1 | 3135 |
| without insert (comparison) | 45.4 | 3.9 | 1450 |

It appears that the process of the invention gives an significant increase both in $ClO_2$ production rate and the $ClO_2$ concentration in the final product solution withdrawn from the eductor.

What is claimed is:

1. Process for continuously producing chlorine dioxide comprising the steps of: feeding chlorate ions, acid and hydrogen peroxide as aqueous solutions to a reactor; reducing chlorate ions in the reactor to chlorine dioxide, thereby forming a product stream in the reactor containing chlorine dioxide; feeding motive water in an eductor comprising a nozzle; bringing the motive water to flow through the nozzle and causing it to flow further through the eductor in an at least partially spiral or helical manner; transferring the product stream from the reactor to the eductor and mixing it with the motive water and thereby forming a diluted aqueous solution containing chlorine dioxide, and;

withdrawing the diluted aqueous solution containing chlorine dioxide from the eductor.

2. Process as claimed in claim 1, wherein motive water is caused to flow further through the eductor in a substantially spiral or helical manner.

3. Process as claimed in claim 1, wherein motive water is brought to flow in an at least partial spiral or helical manner by means of twisted vanes arranged inside or upstream the nozzle in the eductor.

4. Process as claimed in claim 1, wherein motive water is brought to flow in an at least partial spiral or helical manner by means of internal rifling inside or upstream the nozzle in the eductor.

5. Process as claimed in claim 1, wherein the eductor further comprises, in the flow direction from the nozzle, a suction chamber, into which the product stream is transferred from the reactor, and a venturi section, through which the diluted aqueous solution containing chlorine dioxide is withdrawn.

6. Process as claimed in claim 1, wherein the chlorate ions are fed to the reactor as an aqueous solution comprising a metal chlorate and the acid is fed to the reactor as mineral acid.

7. Process as claimed in claim 6, wherein the mineral acid is sulfuric acid.

8. Process as claimed in claim 6, wherein alkali metal chlorate and hydrogen peroxide are fed to the reactor in the form of a premixed aqueous solution.

9. Process as claimed in claim 8, wherein the premixed aqueous solution comprises from about 1 to about 6.5 moles/liter of alkali metal chlorate, from about 1 to about 7 moles/liter, of hydrogen peroxide, at least one of a protective colloid, a radical scavenger or a phosphonic acid based complexing agent, and having a pH from about 0.5 to about 4.

10. Process as claimed in claim 1, wherein molar ratio $H_2O_2$ to $ClO_3^-$ fed to the reactor is from about 0.2:1 to about 2:1.

11. Process as claimed in claim 1, wherein the amount of chloride ions fed to the reactor is below about 1 mole % $Cl^-$ of the $ClO_3^-$.

12. Process as claimed in claim 1, wherein the product stream in the reactor containing chlorine dioxide comprises liquid and foam.

13. Process as claimed in claim 1, wherein the temperature within the reactor is maintained from about 30 to about 60° C.

14. Process as claimed in claim 1, wherein an absolute pressure from about 30 to about 100 kPa is maintained within the reactor.

15. Process as claimed in claim 1, wherein the reactor is a substantially tubular through-flow vessel or pipe.

16. Process as claimed in claim 15, wherein the reactor is arranged substantially vertically.

17. Process as claimed in claim 15, wherein the reactor comprise a disk or the like provided with apertures and arranged inside the reactor, and metal chlorate and hydrogen peroxide are fed downstream of the disk, while an acid is fed upstream of the disk and brought to flow through the apertures and then mix with the metal chlorate and the hydrogen peroxide.

18. Process as claimed in claim 16, wherein the main flow direction is upwards.

19. Process for continuously producing chlorine dioxide comprising the steps of: feeding to a reactor sulfuric acid and a premixed aqueous solution comprising alkali metal chlorate and hydrogen peroxide in a molar ratio $H_2O_2$ to $ClO_3^-$ from about 0.5:1 to about 1.5:1; maintaining in the reactor a temperature from about 30 to about 60° C. and an absolute pressure from about 30 to about 100 kPa; reducing chlorate ions in the reactor to chlorine dioxide, thereby forming a product stream in the reactor containing chlorine dioxide; feeding motive water to an eductor comprising a nozzle, a suction chamber and a venturi section; bringing the motive water to flow through the nozzle and causing it to flow further through the suction chamber and the venturi section in an at least partially spiral or helical, manner by means of twisted vanes arranged inside br upstream the nozzle;

transferring the product stream from the reactor to the mixing chamber and mixing it with the motive water and thereby forming a diluted aqueous solution containing chlorine dioxide, and;

withdrawing the diluted aqueous solution containing chlorine dioxide from the eductor through the venturi section.

* * * * *